United States Patent
Tachibana

[11] Patent Number: 6,007,200
[45] Date of Patent: Dec. 28, 1999

[54] LENS HOLDING MECHANISM OF RIMLESS SPECTACLES

[75] Inventor: Hideaki Tachibana, Sabae, Japan

[73] Assignee: Aoyama Gankyo Kabushiki Kaisha, Fukui, Japan

[21] Appl. No.: 09/264,239

[22] Filed: Mar. 8, 1999

[51] Int. Cl.$^6$ .................................................. G02C 1/04
[52] U.S. Cl. ............................................ 351/110; 351/41
[58] Field of Search ................................. 351/110, 141, 351/111, 41, 153, 106, 86, 92, 158

[56] References Cited

U.S. PATENT DOCUMENTS

| | | | |
|---|---|---|---|
| 5,585,870 | 12/1996 | Masunaga | 351/110 |
| 5,659,380 | 8/1997 | Kobayashi | 351/110 |

*Primary Examiner*—Hung Xuan Dang
*Attorney, Agent, or Firm*—Ronald R. Snider; Snider & Associates

[57] ABSTRACT

Here is disclosed a lens holding mechanism of rimless spectacles with a simple structure, which nonetheless enables the respective lenses to be securely clamped. A first holding aperture and a second holding aperture are provided in the vicinity of the circumferential fringe sides of the respective lenses and a joint member provided with a first thrusting projection and a second thrusting projection is formed extensively from a contra-lens portion of an end-piece or a bridge. The first projection is inserted into the first aperture while the second projection is inserted into the second aperture, and at least the first projection and the first holding aperture are tightly held onto each other by means of a clamping sleeve or cap made of basically, synthetic resin. In spite of such an extremely simple structure, the reliable lens clamping is assured.

9 Claims, 5 Drawing Sheets

LENS HOLDING MECHANISM OF RIMLESS SPECTACLES

RELATED APPLICATIONS

The present application claims the priority of the Japanese Patent Application No. 10-55343 filed on Mar. 6, 1998 and the Japanese Patent Application No. 10-185099 filed on Jun. 30, 1998.

BACKGROUND OF THE INVENTION

1. Technical Field

The present invention relates to a lens holding mechanism of rimless spectacles, in more detail, to such mechanism having an extremely simple structure that the lenses can be securely clamped without using a screw.

2. Prior Art

Recently, a pair of spectacles, which is wide in vision and light in weight, and shapely in form, is pouplar among the wearers in general, and particularly a so-called rimless spectacles is the most popular among them, which does not require a rim enclosing the lenses because the bridge portion symmetrically connecting a pair of lenses as well as the endpiece portions foldably hinging the temples are directly screwed onto holding apertures opened in the vicinity of the fringe sides of the lenses.

However, such prior rimless spectacles was found inconvenient in use because the clamping portions of the lenses at such holding apertures become fluctuated in no time due to the loosening of a screw or wear on the lens holes. That is to say, conventionally, the lens holding has been secured by attaching a supporting member on the bridge and endpieces, which are screwed onto the lenses, and abutting such member on the side surface of the lens, thereby, preventing the rotational displacement of the clamping portions. As such rimless spectacles is very simple in structure, the bridge and endpieces thereof become susceptible to deformation under external forces, with the result that the abutment of the supporting member to the lens side surface becomes insufficient to bring the lens holding portions into an unstable condition.

Nowadays, the tendency for the users, who are not satisfied with the state of the art, to demand further simplification in design and structure of the rimless spectacles, especially of the lens clamping portions thereof, has further led them to complain of the intervention of such supporting member and demand that it should be gotten rid of.

Thus, the present invention is to provide a lens holding mechanism of rimless spectacles having such an extremely simple structure that it can dispense with a screw so as to allow further simplification in design, which nevertheless enables the lenses to be clamped without fluctuation.

DISCLOSURE OF THE INVENTION

A first holding aperture and a second holding aperture are provided in the vicinity of the fringe sides of the respective lenses while a joint member is extensibly formed from a contra-lens portion of an endpiece or both ends of a bridge, which face opposedly to the respective lenses, and provided with a first and a second thrusting projections. The first thrusting projection is inserted into the first holding aperture and at the same time the second thrusting projection is inserted into the second holding aperture, wherein at least the first holding aperture and the first thrusting projection are tightly held onto each other through a sleeve or cap member made of basically. synthetic resin. In this way, with the lens holding mechanism embodied in the present invention, it realizes further simplification in structure of rimless spectacles, which nevertheless enables the lenses to be securely clamped.

BEST MODE FOR CARRYING OUT THE INVENTION

Hereinafter, the present invention is in more detail explained with reference to the accompanying drawings. To begin with, with reference to FIGS. 1 to 6, the lens holding mechanism of the first embodiment is explained as follows.

(First Embodiment)

Figure 1:
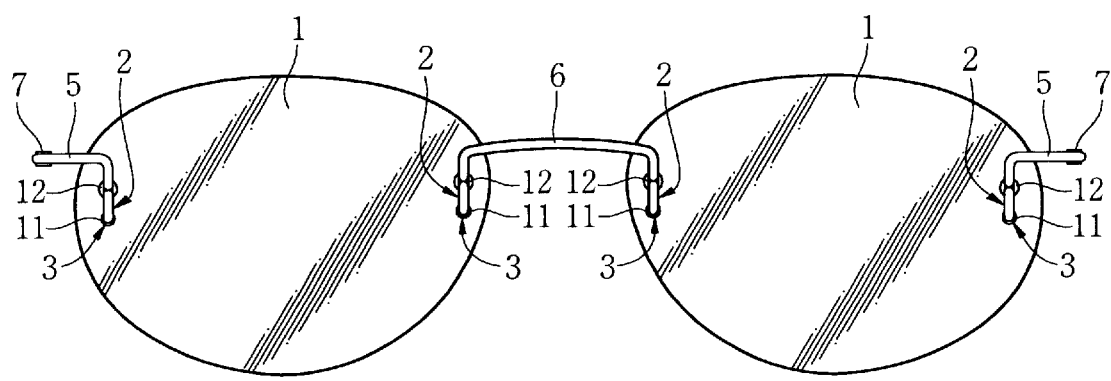
FIG. 1 is a partly frontal view of rimless spectacles constructed by adopting the lens holding mechanism of the first embodiment.
Figure 2:
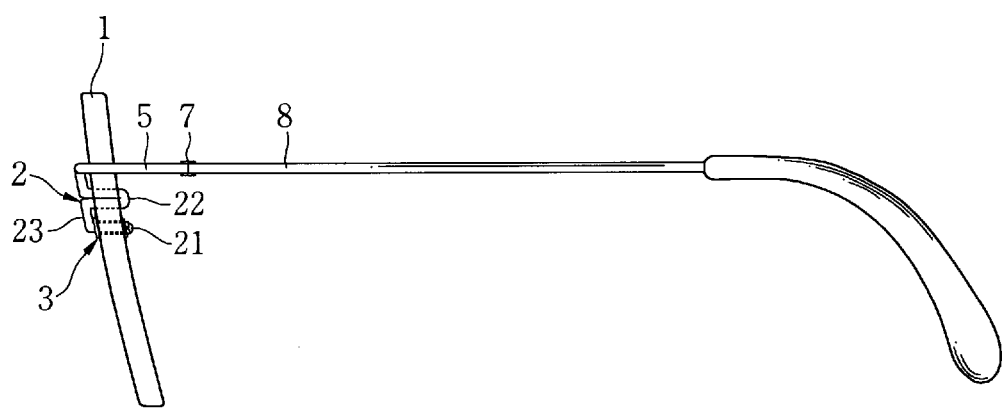
FIG. 2 is a partly elevation view of the rimless spectacles.

As shown in FIGS. 1 and 2, the lens holding mecahnism embodied in the present invention is intended to securely hold the respective endpieces (5) and (5), to which the respective temples (8) are foldably engaged through a hinge (7), onto the outer fringe side of the respective lenses (1) and (1) and to securely hold a bridge (6) suspending a nose pad, which is not shown in the drawings, onto the inner fringe side of the respective lenses (1) and (1).

The reference number (1) indicates a lens made of synthetic resin, in the vicinity of the outer and inner fringe sides thereof respectively, a first holding aperture (11) and a second holding aperture (12) being vertically provided in alignment with each other.

Figure 3:
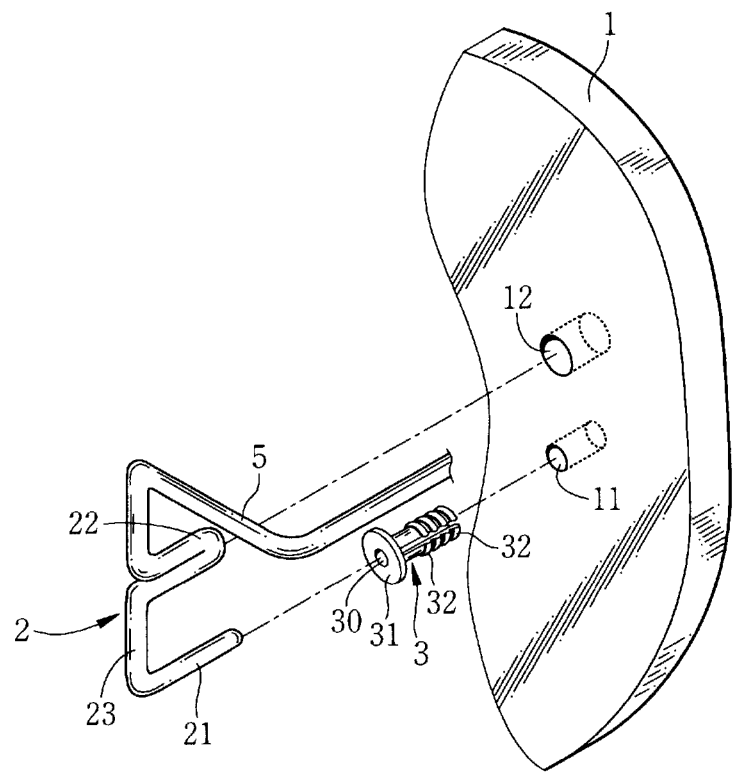
FIG. 3 is an exploded perspective view of the lens holding mechanism of the first embodiment.

The reference number (2) indicates a joint member stretched out from a contra-lens portion of an endpiece (5) and both ends of the bridge (6), which face opposedly to the lenses, this member (2), as shown in FIG. 3, comprising a first thrusting projection (21), a second thrusting projection (22) protruding to the same direction as that of the first projection (21) and a connecting portion (23) to join those projections (21) and (22). In this embodiment, the second thrusting projection (22) is formed by folding back metallic wire, and the second projection, the connecting portion (23) and the first thrusting projection (21) are, in this order, integrally made of metallic wire. Further, this member (2) is integrally moulded of such wire continuously with the respective endpieces (5) and the bridge (6).

Figure 4:
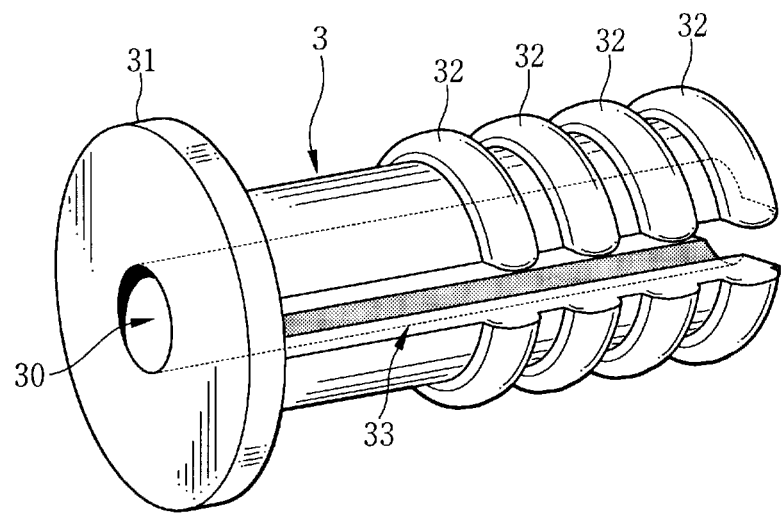
FIG. 4 is an enlarged perspective view of a clamping sleeve incorporated into the lens holding mechanism.

In the drawings, the reference number (3) indicates a lens clamping sleeve made of synthetic resin, which is capable of elastically deforming. As shown in FIG. 4, this sleeve is formed in cylindrical shape with an opening (30) provided therethrough, into which the first thrusting projection (21) of the joint member (2) can be received, and at a first(proximal) end thereof provided with a flange portion (31) to be abutted against the frontal surface of the respective lenses while on the outer circumference thereof and to the side of a second (distal) end thereof provided with the plurality of lugs (32) to be locked onto the circumferential fringe of the first holding aperture (11) on the rear surface (ocular side) of the respective lenses. Said sleeve is provided with a slit (33) extending from the flange portion to the second end thereof.

Figure 5:
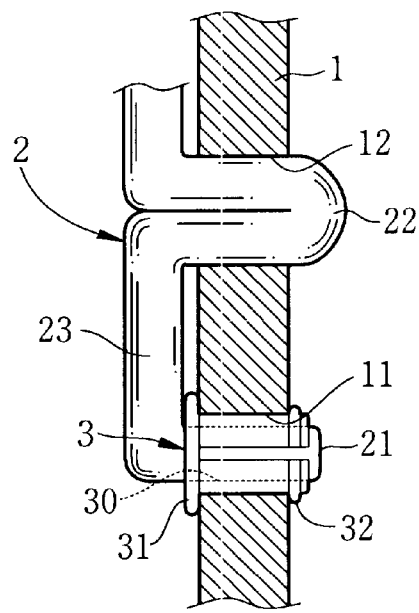
FIG. 5 is a partly enlarged sectional view of the lens holding mechanism.

Said sleeve (3) is inserted into the first holding aperture (11) of the respective lenses with the slit (33) contracted so as to abut the flange portion (31) against the frontal surface of the respective lenses as well as to lock any one of the plurality of said lugs (32) onto the circumferential fringe of the first holding aperture (11) on the rear side (ocular side) surface of the respective lenses. Then, the elastic expansion of the inner surface of the opening (30) caused by tightly inserting the first thrusting projection (21) into the opening (30) of the clamping sleeve (3) and at the same time inserting the second projection (22) into the second aperture (12), as shown in FIG. 5, allows the first holding aperture (11) to be securely interlocked with the flange portion (31) and the lug (32) as well as friction to be caused between the inner surface of the opening (30) and the outer surface of the first thrusting projection (21) so as both to be securely held onto each other, with the result that the endpiece (5) or the bridge (6) is securely clamped to the respective lenses. FIG. 5 shows the other lugs that have excessively remained at the tip end of the sleeve (3) trimmed off.

As mentioned above, with the lens holding mechanism embodied in the present invention, it enables the respective lenses to be securely clamped without using a screw or just by tightly inserting the first projection (21) into the clamping sleeve (3) mounted onto the first holding aperture (11), so that not only the assembly work becomes extremely simplified. But also the lens clamping without fluctuation is assured for a long period of time, in comparison with the prior rimless spectacles that has been prone to the loosening of a screw due to external force such as vibration.

Further, with the lens holding mechanism embodied in the present invention, the sleeve (3) is also applicable to prescription eyeglasses the thickness of which lenses changes according to the degree of correction, as it is made of a soft synthetic resin and provided with the plurality of lugs (32) at the tip end thereof so that any one of those lugs Can be locked onto the circumferential fringe of the first holding aperture (11).

On the other hand, with the lens holding mechanism embodied in the present invention, as the first thrusting projection (21) is held onto the first holding aperture (11) through this sleeve (3) and at the same time the second thrusting projection (22) is inserted into the second holding aperture (12), it can securely prevent the rotational displacement of the first thrusting projection (21) at the first holding aperture (11) without using such a supporting piece to be abutted against the side surface of the respective lenses as having been used for the prior rimless spectacles.

Further, with the lens holding mechanism embodied in the present invention, not only because the second thrusting projection (22) is formed by folding back wire, but also because the endpiece (5) or the bridge (6), the second thrusting projection (22), the connecting portion (23) and first thrusting portion (21) are integrally formed of one string of metallic wire, it can do without brazing operation, which increases labor cost, so that it becomes possible to produce rimless spectacels with a reasonable price, which is very simple in design too.

As one concrete example for working the present invention, the foregoing embodiment has been disclosed, but the present invention is not limited to this disclosure. It should be understood that it can be modified in various manners within the scope of the accompanying claims.

Figure 6:
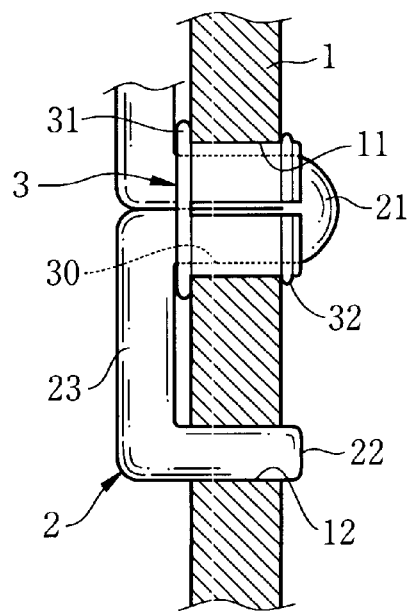
FIG. 6 is a partly enlarged sectional view of the lens holding mechanism showing one of its modifications.
Figure 7:
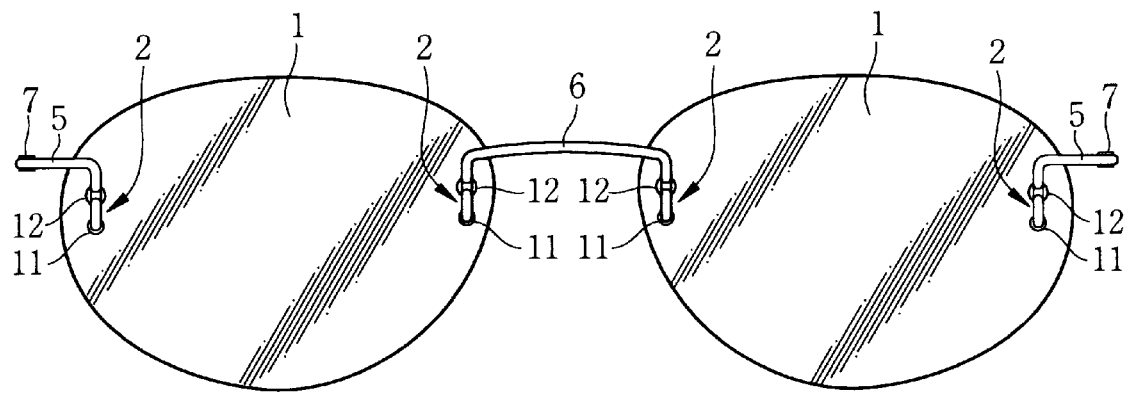
FIG. 7 is a partly frontal view of rimless spectacles constructed by adopting the lens holding mechanism of the second embodiment.
Figure 8:
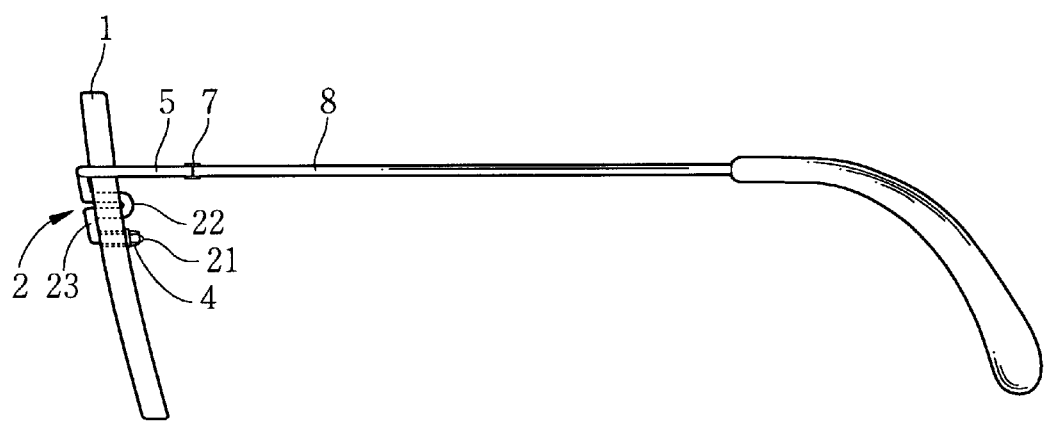
FIG. 8 is a partly elevation view of the rimless spectacles.

For examples, in view of the foregoing, the second thrusting projection (22) to be inserted into the second aperture (12) is formed by folding back metallic wire, but it is not limited to this arrangement. One of its modifications is shown in FIG. 6, where the first thrusting projection (21) to be secured onto the first aperture (11) through the clamping sleeve (3) is formed by folding back metallic wire. In this case, the holding of the first projection (21) onto the first aperture (11) can be secured by using a sleeve (3) of larger bore. Of course, those projections can be both secured onto their corresponding apertures through such sleeve.

In view of the foregoing, the second thrusting projection (22) is formed by folding back metallic wire, and the joint member (2) is integrally formed of one string of wire, but it is not limited to this arrangement. Those projections can be also brazed or fused onto the joint member (2). Also, in the above embodiment, it is arranged so that the first projection is just tightly inserted into the opening (30) of the sleeve (3), but it is not limited to this arrangement. The holding of the first projection (21) onto the aperture (11) enhances by tightly inserting a projection whose circumferential surface is formed uneven into the opening (30).

Also, in view of the foregoing, the first and second holding apertures (11) and (12) are vertically provided in alinement with each other in the vicinity of the fringe sides of the respective lenses, but they can be laterally alined instead. Corresponding to this modification, the first and second thrusting projections (21) and (22) are arranged in the horizontal direction of the lenses.

(Second Embodiment)

Next, with reference to FIGS. 7 to 10, a lens holding mechanism of the second embodiment is explained as follows.

Figure 9:
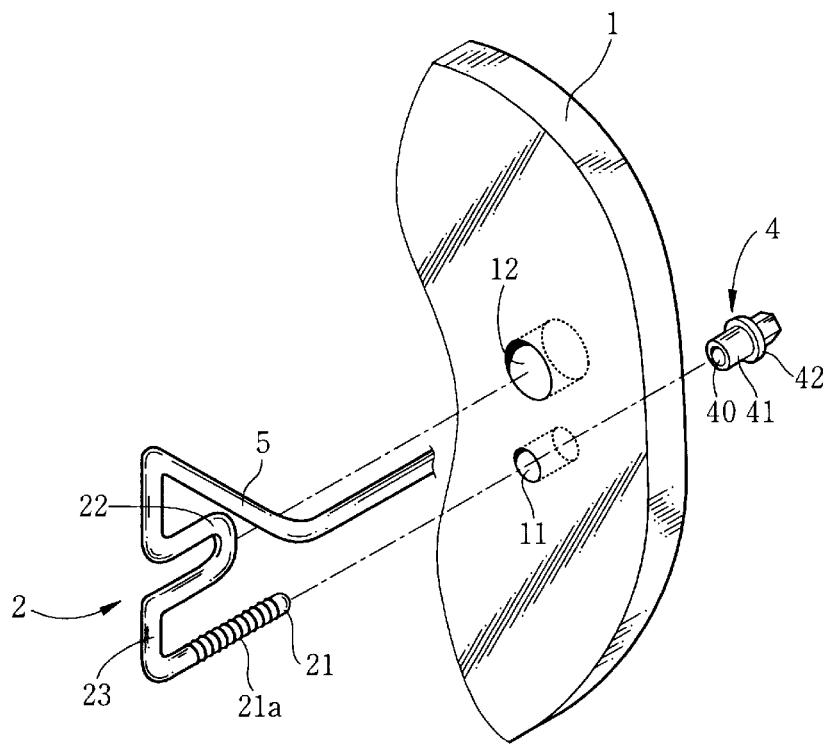
FIG. 9 is an exploded perspective view of the lens holding mechanism of the second embodiment.
Figure 10:
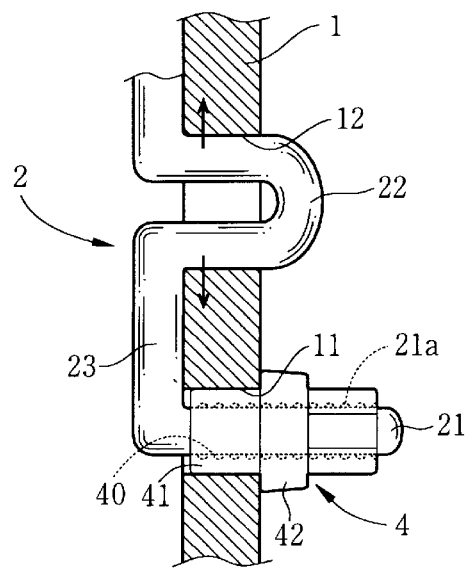
FIG. 10 is a partly enlarged sectional view of the lens holding mechanism according to the second embodiment.

In the drawings, the reference number (1) indicates a lens made of synthetic resin, in the vicinity of the outer and inner fringe sides thereof respectively, a first holding aperture (11) and a second holding aperture (12) being vertically provided in alignment with each other The reference number (2) indicates a joint member stretched out from a contra-lens portion of the respective endpieces (5) and both ends of the bridge (6), which face opposedly to the respective lenses, this member (2), as shown in FIG. 9, comprising a first thrusting projection (21) on the circumference of which a number of lugs (21a) (21a) . . . are formed, an elastically deformable second thrusting projection (22) formed by bending metallic wire so as to contour hairpin curve in such a manner that it protrudes U-shaped to the same direction as that of the first projection (21) and a connecting portion (23) to join those projections. In this way, the second projection (22) is formed U-shaped and rendered springy by bending metallic wire so as to contour hairpin curve. Said second projection (22), connecting portion (23) and first projection (21) are, in this order, integrally formed of metallic wire, and said joint member (2) is integrally moulded of such wire continuously with an endpiece (5) or a bridge (6).

In the drawings, the reference number (4) indicates an elastically deformable lens clamping cap made of synthetic resin with an opening (40) provided therethrough, into which a first thrusting projection (21) can be received. As shown in FIG. 9, this cap comprises a cylindrical portion (41) which can be inserted into a first holding aperture (11) and a flange portion (42) to be abutted against the rear surface (ocular side) of the respective lenses. The expansive deformation of the inner surface of the opening (40) caused by forcedly inserting the first projection (21) having a number of lugs (21a) into the opening allows the first projection to be tightly secured onto the clamping cap (4).

The lens holding mechanism embodied in the present invenion has such an easy structure that the U-shaped and springy second thrusting projection (22) is compressedly inserted into the second holding aperture (12) and at the same time the first thrusting projection (21) is inserted into the first holding aperture (11), and then a clamping cap (4) is tightly mounted onto the first projection (21) through its lugs (21a) from the tip end thereof (or from the rear side of the respective lenses), which nevertheless enables the endpiece (5) or the bridge (6) to be secured onto the respective lenses (1).

As described above, the lens holding mechanism embodied in the present invention enables the respective lenses to be clamped without using a screw at all or just by tightly mounting the clamping cap (4) onto the first projection (21) inserted into the first aperture (11), so that the assembly work becomes extremely easy as well as the loosening of a screw due to vibration is no more concern to the users because of its riddance, with the result that the lenses can be clamped without fluctuation for a long period of time.

In addition, as the clamping cap (4) embodied in the present invention is provided with a cylindrical portion (41) which can be received into the first aperture (11), this portion acts as a washer. The expansive deformation of the inner surface of the opening (40) through the lugs (21a) of the first projection (21) allows friction between the inner surface of the aperture (11) and the outer surface of said cylindrical portion (41) to increase, also in this regard, the lens clamping without fluctuation can be achieved.

Moreover, due to the fact that the inner surface of the opening (40) is not provided with any projections, and as the clamping cap (4) is tightly mounted onto the first projection (21) by the expansive deformation of the inner surface of the opening (40) exclusively by virtue of the lugs (21a) of the projection (21), the cap can be fitted onto any appropriate locations of the first projection. Thus, the lens holding mechanism embodied in the present invention is also applicable to prescription eyeglasses whose lens thickness changes, according to the degree of correction.

Furthermore, with the lens holding mechanism embodied in the present invention, as the first projection (21) is secured onto the first aperture (11) by means of the clamping cap (4) and at the same time the U-shaped springy second projection (22) is inserted into the second aperture (12), it can securely prevent the rotational displacemnet of the first projection at the first aperture without using a supporting piece to be abutted against the side surfaces of the respective lenses as having been used in the prior rimless spectacles.

In addition, as it is arranged so that the U-shaped springy second projection (22) is compressedly inserted into the second aperture (12), the former itself can be easily secured onto the latter by virtue of its elastic recovery nature. Accordingly, this makes the assembly work easy to proceed as well as precise and severe work for adjusting the relative opening position and the like of the second aperture (12) with regard to the first aperture (11) unnecessary, with the result that the production cost can be lowered.

Also, the second projection compressedly inserted into the second aperture (12) absorbs external force or impact, especially such force to urge the temples (8) to expand outwards, so that there is no case where the lens clamping portions are prone to cracking as in the case of the prior rimless spectacles.

More than that, with the lens holding mechanism embodied in the present invention, as the second projection (22) is formed U-shaped by bending wire so as to contour hairpin curve as well as the endpiece (5) or the bridge (6), the second projection (22), connecting portion (23) and first projection (21) are integrally formed of one continuous string of metallic wire, it can do without brazing operation, which is time-consuming and boosts the production cost, so that a pair of rimless spectacles which is not only simple in design, but also reasonable in price can be supplied on the market.

As another concrete example for working the present invention, the foregoing embodiment has been disclosed, but the present invention is not limited to this disclosure. It should be understood that it can be modified in various manners within the scope of the accompanying claims.

For examples, in the above embodiment, the plurality of circular lugs (21a) . . . (21a) . . . are provided on the circumference of the first projection (21). But it is not limited to this arrangement. Provided that they can be inserted into the opening (40) and fixed therein, the number of those lugs and the disposing location and configuration thereof etc., Can be modified in various manners.

Also, in the above embodiment, the second projection (22) is formed by bending metallic wire so as to contour hairpin curve, but it is not limited to this arrangement. As in the first embodiment, the former can be formed by folding back the latter. Likewise, the joint member (2) is integrally formed of one string of wire, but it is not limited to this arrangement. The first and second projections can be brazed or fused onto the joint member (2).

What is claimed is:

1. A lens holding mechanism of rimless spectacles comprising:

a pair of lenses (1), said respective lenses having a first holding aperture (11) and a second holding aperture (12) provided in the vicinity of the circumferential fringe sides thereof;

a joint member (2) extended from a contra-lens portion of one of an endpiece (5) and a bridge (6), said member being provided with a first thrusting projection (21) and a second thrusting projection (22);

and a clamping sleeve (3) made of synthetic resin and formed in cylindrical shape, said sleeve being provided with an opening (30) therethrough, into which said first projection (21) can be inserted, and provided with a flange portion (31) at a proximal end portion thereof while at least at a distal end portion thereof provided with a locking lug (32), which is formed on the outer circumference thereof, wherein one of the endpiece (5) and the bridge (6) is securely held onto the respective lenses by inserting said sleeve (3) into the holding aperture (11) and abutting said flange portion (31) against a surface of the respective lenses (1) as well as locking said lug (32) onto a circumferential fringe of said aperture, and then tightly inserting said first projection (21) into said opening (30) while inserting the second projection (22) into the second aperture (12).

2. A lens holding mechanism of rimless spectacles according to claim 1 wherein at least one of the first projection (21) and the second projection (22) is formed by bending back wire and the joint member (2) is formed of continuous wire.

3. A lens holding mechanism of rimless spectacles according to claim 2 wherein the second projection (22) is formed elastically deformable by bending wire so as to contour hairpin curve, said projection (22) being compressedly inserted into the second holding aperture (12).

4. A lens holding mechanism of rimless spectacles according to claim 1 wherein the second projection (22) is formed elastically deformable by bending wire so as to contour hairpin curve, said projection (22) being compressedly inserted into the second holding aperture (12).

5. A lens holding mechanism of rimless spectacles according to claim 1 wherein a slit (33) is provided longitudinally along the clamping sleeve (3).

6. A lens holding mechanism of rimless spectacles comprising:

a pair of lenses (1), said respective lenses having a first holding aperture (11) and a second holding aperture (12) provided in the vicinity of the circumferential fringe sides thereof;

a joint member (2) extended from a contra-lens portion of one of an endpiece (5) and a bridge (6), said member being provided with a first thrusting projection (21) on the circumference of which at least one lug (21a) is formed and a second thrusting projection (22) which protrudes to the same direction as that of said first projection (21);

and a clamping cap (4) made of synthetic resin, said cap being provided with an opening (40) therethrough, into which said first projection (21) can be inserted, wherein one of the endpiece (5) and the bridge (6) is securely held onto the respective lenses by inserting said first projection (21) into the first aperture (11) while inserting said second projection (22) into said second aperture (12), and tightly mounting said cap (4) onto the first projection (21) through the at least one lug (21a).

7. A lens holding mechanism of rimless spectacles according to claim 6 wherein the clamping cap (4) is provided with a cylindrical portion (41), which is fittable onto the first holding aperture (11).

8. A lens holding mechanism of rimless spectacles according to claim 6 wherein at least of one of the first projection (21) and the second projection (22) is formed by bending back wire and the joint member (2) is formed of continuous wire.

9. A lens holding mechanism of rimless spectacles according to claim 6 wherein the second projection (22) is formed elastically deformable by bending wire so as to contour hairpin curve, said projection (22) being compressedly inserted into the second holding aperture (12).

* * * * *